United States Patent
Bravery et al.

(10) Patent No.: US 8,626,839 B2
(45) Date of Patent: Jan. 7, 2014

(54) PEER COMPUTER SYSTEM

(75) Inventors: Andrew James Frederick Bravery, Wiltshire (GB); Alan William Knox, Hants (GB); Simon Laws, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 2653 days.

(21) Appl. No.: 10/555,433

(22) PCT Filed: Nov. 12, 2003

(86) PCT No.: PCT/GB03/04891
§ 371 (c)(1),
(2), (4) Date: Nov. 3, 2005

(87) PCT Pub. No.: WO2005/004018
PCT Pub. Date: Jan. 13, 2005

(65) Prior Publication Data
US 2007/0050486 A1    Mar. 1, 2007

(30) Foreign Application Priority Data
Jun. 28, 2003    (GB) .................................. 0315204.8

(51) Int. Cl.
*G06F 15/16*    (2006.01)

(52) U.S. Cl.
USPC ........... 709/206; 709/205; 709/218; 709/201; 709/223

(58) Field of Classification Search
USPC .......................... 709/218, 223, 206, 205, 201
See application file for complete search history.

(56) References Cited

U.S. PATENT DOCUMENTS

| | | | | |
|---|---|---|---|---|
| 7,222,156 | B2 * | 5/2007 | Gupta et al. | 709/206 |
| 7,328,243 | B2 * | 2/2008 | Yeager et al. | 709/205 |
| 2002/0062336 | A1 | 5/2002 | Teodosiu et al. | |
| 2003/0078918 | A1 | 4/2003 | Souvignier et al. | |

FOREIGN PATENT DOCUMENTS

KR    PUPA200340297    5/2003

OTHER PUBLICATIONS

Dornfest et al., "The Power of Metadata," In: Peer-To Peer: Harnessing the Power of Disruptive Technologies, Minar et al.(Eds.), Feb. 2001, accessed from http://openp2p.com/lpt/a/554 on Jun. 11, 2012, 10 pages.

Milojicic et al., "Peer-to-Peer Computing," Hewlett-Packard Company, Jul. 10, 2002, 52 pages.

White et al., "Sharing @ The Edge: Secure Information Sharing," School of Computer Science, Carleton University, Ottawa, Canada, Nov. 11, 2001, 6 pages.

* cited by examiner

*Primary Examiner* — Kyung H Shin
(74) *Attorney, Agent, or Firm* — Yee & Associates, P.C.; David A. Mims, Jr.

(57) ABSTRACT

A first peer computer system operable in a peer to peer network, comprising: means for accessing a first piece of information, means for creating a first entity (e.g. a "token"), means for associating the first entity with the first piece of information (e.g. attaching the first piece of information to the entity) and wherein the first entity is associated with a topic of the information.

3 Claims, 6 Drawing Sheets

```xml
<?xml version="1.0"?>
<schema xmlns="http://www.w3.org/2001/XMLSchema"
targetNamespace="http://www.hursley.ibm.com/hst/viewpoint/v0.1/token"

<annotation>
    <documentation xml:lang="en">First schema for a token v0.1.0</documentation>
  </annotation>

<complexType name="TokenType">
    <sequence>

<element name="TokenId" type="Name"/>
      <element name="TokenParent" type="Name"/>
      <element name="TokenCreated" type="token:TokenCreatedType"/>
      <element name="Title" type="string"/>
      <element name="UserNotes" type="token:UserNotesType"/>

</complexType>
    </sequence>
    xmlns:token="http://www.hursley.ibm.com/hst/viewpoint/v0.1/token" elementFormDefault="qualified" attributeFormDefault="unqualified">

<complexType name="TokenCreatedType">
    <attribute name="byClient" type="Name" use="required"/>
    <attribute name="date" type="date"/>
    <attribute name="method" type="string" use="optional"/>
  </complexType>

<complexType name="UserNotesType">
    <sequence>
      <element name="UserNote" type="token:UserNoteType" maxOccurs="unbounded"/>
    </sequence>
  </complexType>

<element name="token" type="token:TokenType"/>

<complexType name="UserNoteType">
    <simpleContent>
      <extension base="string">

<attribute name="client" type="Name" use="required"/>
        <attribute name="lastEditDate" type="date" use="required"/>

</extension>
    </simpleContent>
  </complexType>
</schema>
```

FIG. 1

```
<?xml version="1.0" encoding="iso        -8859 -1"?>
<Token>
    <Title>SolutionForCustomer_A</Title>
    <TokenId>1000</TokenId>
    <TokenParent>None</TokenParent>
    <TokenCreated byClient=" Salesman_A" date="Oct 11, 2003"
    method="webapp"/>
    <UserNotes>
          <UserNote client="Salesman_A"
             lastEditDate="Thu Oct 11 08:52:19 GMT+01:00 2003"
             Customer_A needs an IT solution for his shipping company.
             We need to research the IT components as well as the
             services we can offer </UserNote>
    </UserNotes>
</Token>
```
200

FIG. 2A

```
<?xml version="1.0" encoding="iso        -8859 -1"?>
<Token>
    <Title>SolutionForCustomer_A</Title>
    <TokenId>1000</TokenId>
    <TokenParent>None</TokenParent>
    <TokenCreated byClient=" Salesman_A" date="Oct 11, 2003"
    method="webapp"/>
    <UserNotes>
          <UserNote client="Salesman_A"
             lastEditDate="Thu Oct 11 08:52:19 GMT+01:00 2003"
             Customer_A needs an IT solution for his shipping
             company. We need to research the IT components as well
             as the services we can offer</UserNote>
          <UserNote client="Salesman_B"
             lastEditDate="Thu Oct 11 09:30:56 GMT+01:00 2003"
             Please research the hardware required for a web system
             for Customer_A</UserNote>
    </UserNotes>
</Token>
```
200

FIG. 2B

```
<?xml version="1.0" encoding="iso     -8859 -1"?>
  <Token>
      <Title>WebSystemForCustomer_A</Title>
      <TokenId>1001</TokenId>
      <TokenParent>1000</TokenParent>
      <TokenCreated byClient=" Salesman_C " date="Oct 12, 2003"
      method="webapp"/>
      <UserNotes>
            <UserNote client="Salesman_C"
                  lastEditDate="Fri Oct 12 11:34:45 GMT+01:00 2003"
                  The customer will need 3 web servers, 20 client
                  computers and a broadband connection</UserNote>
      </UserNotes>
  </Token>
```

```
<?xml version="1.0" encoding="iso         -8859 -1"?>
  <Token>
    <Title>SolutionForCustomer_B</Title>
    <TokenId>1100</TokenId>
    <TokenParent>None</TokenParent>
    <TokenCreated byClient=" Salesman_A" date="Oct 21, 2003"
    method="webapp"/>
    <UserNotes>
           <UserNote client="Salesman_A"
               lastEditDate="Thu Oct 21 14:34:45 GMT+01:00 2003"
               Let us meet tomorrow morning to discuss the progress on
               the solution for Customer_B</UserNote>
    </UserNotes>
    <Token>3
```

PEER COMPUTER SYSTEM

FIELD OF THE INVENTION

The present invention related to the field of peer to peer computing.

BACKGROUND OF THE INVENTION

Coordinating linked activities (collaboration) is increasingly important to competitive advantage. Through collaboration, an enterprise can reduce transaction costs, gather better information, save operational costs and reap time efficiencies. Applications that facilitate collaborative computing include e-mail, group calendaring and scheduling, shared folders/databases, threaded discussions, and custom application development.

Collaborative systems today are primarily host peer device based and an example of a model used is the synchronization model, wherein a host peer device holds the master version of data and users work on local versions of the data. At intervals, a user connects to the host peer device and the local version of the data is synchronized with the master version of the data. This model is often used for Personal Information Management (PIM) applications e.g. calendar, email etc.

Another computing model that has become popular in recent years is the peer-to-peer (P2P) model. This model is decentralized and comprises a number of "peers" interacting with each other, wherein a peer is similar in capabilities to other peers. P2P computing has enabled data sharing without a host peer device and with the increase of personal and mobile technology (e.g. mobile telephones, Personal Digital Assistants (PDAs) etc.) there is a need to support collaborative computing but in a disconnected P2P environment.

However, since there is no central host peer device with control over the peers or the data in the system, the P2P model faces problems that are not present in the synchronization model, for example, data tracking.

DISCLOSURE OF THE INVENTION

According to a first aspect, the present invention provides a first peer computer system operable in a peer to peer network, comprising: means for accessing a first piece of information; means for creating a first entity; means for associating the first entity with the first piece of information; wherein the first entity is associated with a topic of the first piece of information.

Preferably, the first entity comprises a unique identifier. More preferably, the first entity comprises the date on which the first entity was created. Still more preferably, the first entity comprises the first piece of information. However, alternatively, the first entity is separate to the first piece of information In a preferred embodiment, the system further comprises means for defining the first entity (e.g. a schema). Preferably, the system further comprises means for storing the first entity. More preferably, the system further comprises means for sending the first entity to a second peer computer system.

Preferably, there is provided means for creating a second entity, wherein the second entity is associated with a sub-topic of the first piece of information. The first entity is therefore a parent entity and the second entity is a child entity. Preferably, the second entity comprises a reference to the first entity, wherein in one embodiment, the reference is a parent reference.

Aptly, a second entity is associated with a second piece of information, wherein the second entity is associated with a different topic to the first entity. More aptly, the means for defining is operable to be configured so that different scenarios (e.g. a business domain, a leisure domain) can be reflected.

In one embodiment, the first piece of information is a music file and the first entity comprises one or more of the following: data associated with the music file owner, the date on which a download of the music file occurred, data associated with the device that downloaded the music file, the date on which the downloaded file was sent, data associated with the device that receives the downloaded file.

According to a second aspect, the present invention provides a peer to peer network, comprising: the first peer computer system as described above; a second peer computer system; and means for communicating between the first peer computer system and the second peer computer system.

Preferably, the second peer computer system comprises means for accessing an updated version of the first piece of information, wherein the first peer computer system comprises means for sending a request for the updated version to the second peer system and wherein the second peer computer system comprises means for sending the updated version to the first peer computer system.

Preferably, each peer computer system comprises means for controlling access to that peer computer system. In a preferred embodiment, the network further comprises a host peer computer system. More preferably, the network further comprises a software agent for determining the most current version of a piece of information.

According to a third aspect, the present invention provides a method for use in a first peer computer system operable in a peer to peer network, comprising the steps of: accessing a first piece of information; creating a first entity; associating the first entity with the first piece of information; wherein the first entity is associated with a topic of the information.

According to a fourth aspect, the present invention provides a computer program comprising program code means adapted to perform the method as described above when said program is run on a computer.

In the following examples, the tokens shown are constructed using XML, however it be understood by one skilled in the art that the tokens can be constructed in many other ways

BRIEF DESCRIPTION OF THE DRAWINGS

The present invention will now be described, by way of example only, with reference to preferred embodiments thereof, as illustrated in the following drawings:

FIG. 1 shows one example of a token schema;
FIG. 2A shows one example of a token;
FIG. 2B shows an updated version of the token of FIG. 2,
FIG. 3 shows an example of a child token of the token of FIG. 2A;
FIG. 4 shows another example of a token.

DETAILED DESCRIPTION OF THE INVENTION

The present invention facilitates collaboration in a decentralized environment, via a "token" that is associated with a piece of data in the environment. A token represents a "topic"

(i.e. a coherent thread) of the data and allows a user to keep track of a topic or topics of data in the environment. In one embodiment, a token comprises extra data associated with that piece of data. In another embodiment, the token comprises extra data associated with a piece of data and the piece of data itself.

Figure 5:
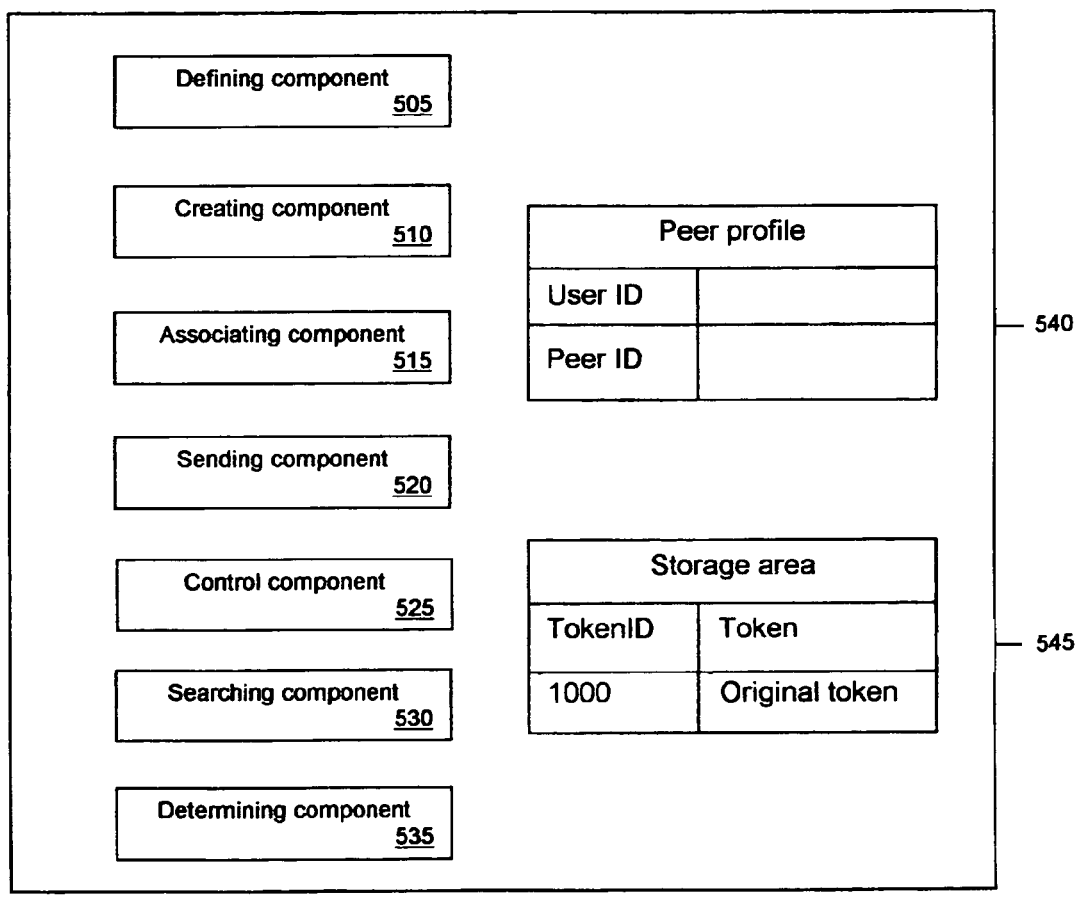
FIG. 5 is a schematic drawing of one example of a peer device and its associated components.
Figure 6:
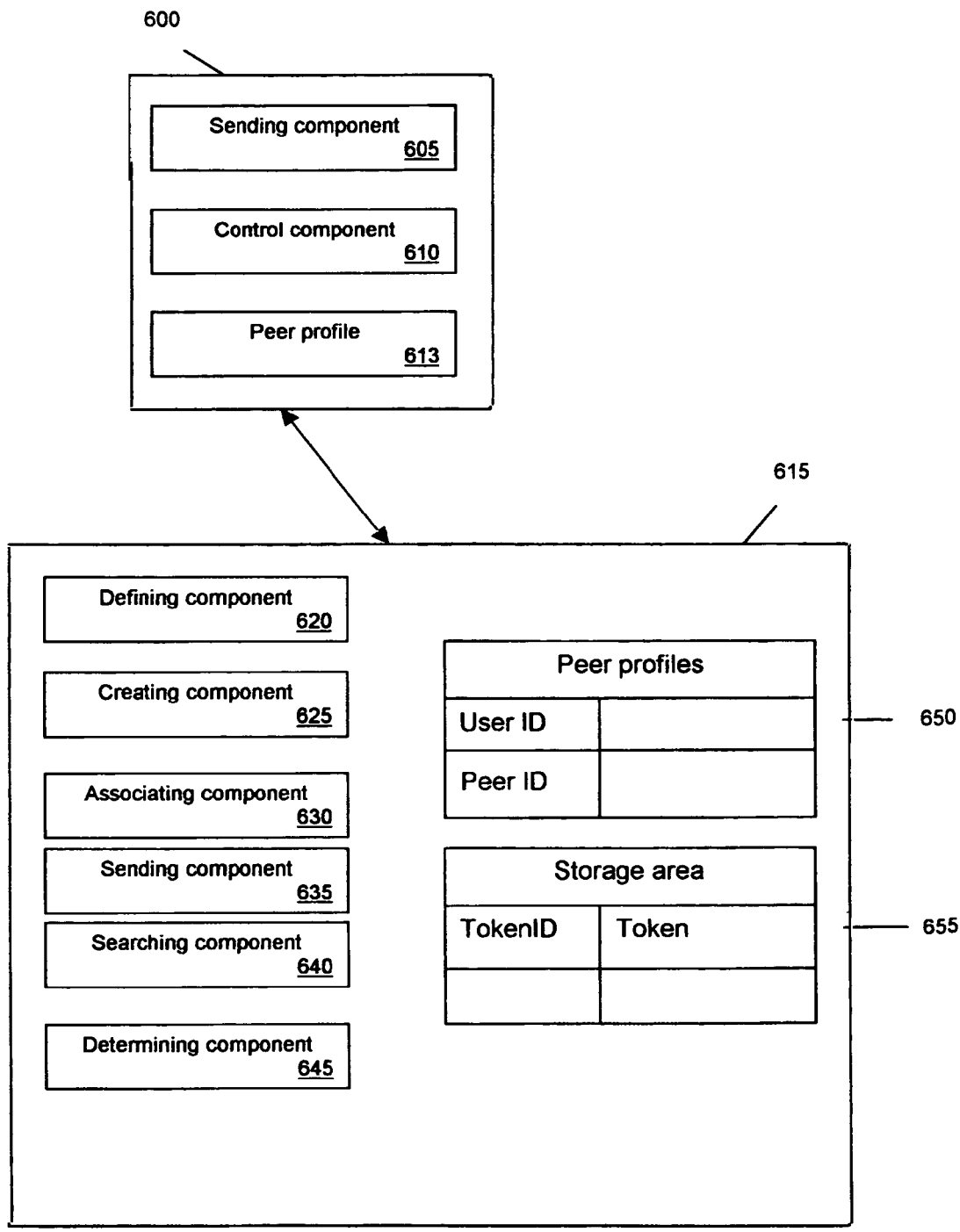
FIG. 6 is a schematic drawing of one example of a peer device and a host peer device.

FIG. 1 shows one example of a defining component for defining the token (also shown as 505 in FIG. 5). In the preferred embodiment, the defining component is a XML schema that defines the extra data and the token is constructed in XML. As shown in FIG. 1, the schema defines a unique identifier (i.e. "TokenId"); the token's parent's identifier if relevant (i.e. "TokenParent"); data associated with the created token (i.e. "TokenCreated"), namely, the user that has created the token (i.e. "byClient")—preferably, the token's creator is included, however, this may not be appropriate in a P2P environment, wherein anonymity is usually maintained, the date on which the token was created (i.e. "date"), the method by which the token was created (i.e. "method") and data associated with a free text area ("UserNotes"), namely, preferably the user who has entered free text (i.e. "client") and the date on which the free text associated with that user was last edited (i.e. "lastEditDate").

A first scenario involves a team of software sales people (Seller_A, Seller_B and Seller_C) in an IT company. In this environment a sales person's initial contact with a customer can lead to many people performing tasks in support of the proposal generation process. In this scenario, the team members have an associated peer device. FIG. 5 shows an overview of a peer device (500) in which the present invention may be implemented and will be described in more detail, with reference to various scenarios.

Referring to FIG. 2A and FIG. 5, preferably, a peer device comprises a profile (540) that stores a unique identifier for that peer device. Preferably, the profile comprises other information associated with the peer device (e.g. an identifier associated with the user of the peer device, security attributes etc.).

Seller_A is the first to make contact with a customer. Seller_A creates a first piece of information (highlighted in bold) on his peer device (500), for example, via a word processing application program.

According to the present invention, a creating component (510) creates a token (200) by preferably using the defining component (505). Next, the token (200) is associated (by an associating component (515)) with the first piece of information. Preferably, the token (200) is stored in a storage area (545). In a preferred embodiment, the storage area (545) stores the unique token identifier of a token, as well as the token itself. Seller_A's storage area is shown below:

| TokenID | 1000 |
|---|---|
| Token | Original token (shown in FIG. 2A) |

Next, a copy of the token (200) (i.e. Copy 1) is sent directly, (i.e. without a host peer device involved) via a sending component (520) (e.g. Bluetooth), to Seller_B. In one example, the sending component (520) scans Seller_B's peer profile (540) for the unique identifier of the peer device.

Once Seller_B receives the copy of the token (200), preferably, the copy is stored in a storage area (545) on Seller_B's peer device (500). Seller_B's storage area is shown below:

| TokenID | 1000 |
|---|---|
| Token | Copy 1 |

Referring to FIG. 2B, Seller_B creates a second piece of information (highlighted in bold) having the same thread as the first piece of information. In this embodiment, Seller_B adds the second piece of information to Copy 1, thereby augmenting the original token.

Preferably, the augmented token (200) is stored in the storage area (545) on Seller_B's peer device (500). Seller_B's storage area is shown below:

| TokenID | 1000 |
|---|---|
| Token | Copy 1; augmented token (shown in FIG. 2B) |

Next a copy of the augmented token (200) (i.e. Copy 2) is sent directly, via the sending component (520) (e.g. via Infra Red), to Seller_C. Once Seller_C receives the copy, preferably, the copy is stored in a storage area (545) on Seller_C's peer device (500). Seller_C's storage area is shown below:

| TokenID | 1000 |
|---|---|
| Token | Copy 2 |

From this scenario, it can be seen that the token (200) exists in different states (shown in FIG. 2A and FIG. 2B). Each state can now evolve (i.e. through addition of information) separately, in a different way, if required.

In one embodiment, preferably, Seller_A obtains access to the augmented token. Preferably, Seller_A's peer device (500) contacts Seller_B's peer device (500), in order to send a request, via the sending component (520), to access the augmented token. In one embodiment, the request comprises the token identifier of the augmented token (it should be understood that in this scenario, the token identifier of the augmented token is the same as the identifier of the original token) as well as a request for the most current version of the augmented token. In this example, the augmented token has the same identifier (i.e. 1000) as the original token, because the augmented information follows the same thread as the original information.

Once the request is received at Seller_B's peer device (500), preferably, Seller_B interacts with a control component (525) on the peer device (500) that allows Seller_B to either reject or accept the request. If Seller_B rejects the request, communication ends and preferably, a notification is sent to Seller_A's peer device (500). If Seller_B accepts the request, preferably, a searching component (530) (e.g. a software agent, a search engine) is executed in order to search the storage area (545), using the augmented token identifier. If a match does not occur, preferably, a notification is sent to Seller_A's peer device (500). In this case, a match does occur:

| TokenID | 1000 |
|---|---|
| Token | Copy 1; augmented token (shown in FIG. 2B) |

Preferably, a determining component (535) for determining the most current version of a token is executed. In one embodiment, the determining component monitors the "lastEditDate" field of each version of the token, wherein the most current "lastEditDate" value, determines the most current version of the token. In this scenario, the augmented token is the most current version and preferably another copy of the token (i.e. Copy 2') is taken and sent to Seller_A's peer device (500), via the sending component (520).

Once Copy 2' is received at Seller_A's peer device (500), preferably, it is stored in the storage area (545). In a preferred embodiment, in the storage area (545) of Seller_A's peer device (500), the original token (200) and Copy 2' are stored:

| TokenID | 1000 |
|---------|------|
| Token | Original token (shown in FIG. 2A), Copy 2' |

In an alternative embodiment, Copy 2' overwrites the original token (200), so that Seller_A can access only the more current version of the token.

In a further embodiment, Seller_B contacts Seller_C to obtains access to the most current version of the augmented token. If the version Seller_C holds is more current than the version Seller_B holds, preferably, Seller_B sends a copy of this to Seller_A.

In an alternative embodiment, a team member can obtain access to a token existing in a state that he or she does not have, automatically. For example, Seller_A can set an option (e.g. in his profile) that allows automatic receipt of the most current version of the original token.

Preferably, for a topic of information, a list comprising information associated with the peer devices of the team members that collaborate is stored. The option preferably comprises a mechanism (e.g. a software agent) that automatically trawls the storage areas (545) of all the team members and determines the most current version of the token held within the team. Preferably, once found, the most current version is then sent to Seller_A.

As described in the above scenario, advantageously, a token can be shared in a flexible manner between members of a team, by allowing the team members to reference the same token. The token allows members to maintain an interest in a pool of information that is common to the team. As work progresses, each member of the team may augment the token with more information. Therefore, although a token can exist in different states, beneficially, a member can obtain the token existing in a state that he or she does not have. It is therefore possible to track information in the environment. Advantageously, the token can be constructed and shared in environments that do not comprise a host peer device.

A second scenario involving a sub-team of software sales people (Seller_B, Seller_C) will now be described, with reference to FIG. 3 and FIG. 5. In this example, the sub-team is working on the "IT components" issue for the customer.

Firstly, Seller_C creates a third piece of information (highlighted in bold) that is related to the IT components piece of work and is therefore related to the first and second pieces of information. The creating component (510) creates a token (300), so that the members of the sub-team can collaborate on a sub-topic (a sub-thread) of the work. The token is therefore a child token (300) of the original token (200).

Next, the associating component (515) associates the child token (300) with the third piece of information. The child token (300) comprises extra data associated with the third piece of information. It should be noted that the child token (300) has a different unique token identifier to the parent token (200). However, the child token (300) comprises extra data associated with the unique token identifier of its parent.

Preferably, the child token (300) is stored in a storage area (545) on Seller_C's peer device (500). Seller_C's storage area is shown below:

| TokenID | 1000 |
|---------|------|
| Token | Copy 2 |
| TokenID | 1001 |
| Token | Child token (shown in FIG. 3) |

Next, a copy of the child token (300) (i.e. Copy 3) is sent directly, via the sending component (520), to Seller_B. Preferably, once received, the copy is stored in the storage area (545) on Seller_B's peer device (500). Seller_B's storage area (545) is shown below:

| TokenID | 1000 |
|---------|------|
| Token | Copy 1; augmented token (shown in FIG. 2B) |
| TokenID | 1001 |
| Token | Copy 3 |

Although Seller_A has not participated in the sub-topic of work, preferably, Seller_A can obtain access to the child token (300), for example, via the process described above wherein a copy (i.e. Copy 3') of the child token (300) is preferably taken and sent to Seller_A's peer device (500). Once received, preferably the copy is stored in the storage area (545) on Seller_A's peer device (500). Seller_A's storage area (545) is shown below:

| TokenID | 1000 |
|---------|------|
| Token | Original token (shown in FIG. 2A), Copy 2' |
| TokenID | 1001 |
| Token | Copy 3' |

As described in this scenario, the provision of child tokens allows sub-teams to tackle threads of work that may not be directly related to the original thread. This reflects the way in which people collaborate, since in a real situation, information generated from a sub-team may or may not be shared with the team as a whole. Beneficially, a member outside of the sub-team can still obtain the information generated from the sub-team. Also, the reference in the child token to the parent token allows for a "token trail", so that information can be tracked and kept coherent.

Referring to FIG. 4 and FIG. 5, a third scenario involving a team of software sales people (Seller_A, Seller_D) will now be described. Seller_A creates a fourth piece of information (highlighted in bold) to-send to Seller_D. In this scenario, the fourth piece of information is unrelated to the first, second and third pieces of information.

The creating component (510) creates a token (400), and the associating component (515) associates the token (400) with the fourth piece of information. Preferably, the token (400) is stored in the storage area (545) on Seller_A's peer device (500). Seller_A's storage area (545) is shown below:

| TokenID | 1000 |
|---------|------|
| Token | Original token (shown in FIG. 2A), Copy 2' |
| TokenID | 1001 |
| Token | Copy 3' |
| TokenID | 1100 |
| Token | Original token (shown in FIG. 4), |

Next, a copy of the token (400) (i.e. Copy 4) is sent directly, via the sending component (520), to Seller_D. Preferably, once received, the copy is stored in the storage area (545) on Seller_D's peer device (500). Seller_D's storage area (545) is shown below:

| | |
|---|---|
| TokenID | 1100 |
| Token | Copy 4 |

As described in this scenario, it can be seen that a team member (i.e. Seller_A can hold different tokens (i.e. 1000, 1001, 1100), wherein each token represents a different topic (thread) or a sub-topic (sub-thread) of information. Therefore, as a team member obtains more information about a particular topic, he or she can add it to and collaborate with the appropriate token.

In another embodiment, a "hybrid" system is provided comprising a host peer device (which can be thought of as a "meta peer" device) and peer devices. Preferably, in this embodiment, the peer device (600) comprises a sending component (605), a control component (610) and a peer profile (613). Preferably, in this embodiment, the host peer device (615) comprises a defining component (620), a creating component (625), an associating component (630), a sending component (635), a searching component (640) and a determining component (645).

The host peer device (615) also preferably stores peer device profiles (650) and token information (655). In a preferred embodiment, the host peer device (610) stores all versions of a token. Advantageously, since a store of all versions of the tokens is kept, this is a useful source of intelligence. In an alternative second embodiment, the host peer device (610) stores the most current version of a token.

In this environment, with reference to the first scenario, Seller_A creates a first piece of information on his peer device (600). Preferably, the information is sent, via the sending component (605) to the host peer device (615), with a request to send the information to Seller_B. Once received, a token is created by the creating component (625) by preferably using the defining component (620). Next, the token is associated (by the associating component (630)) with the first piece of information. Preferably, the token is stored in a storage area (655). More preferably, the unique token identifier that has been generated in the creation process, is sent to Seller_A's peer device (600).

In a preferred embodiment, the unique token identifier is also sent, via a sending component (635), to Seller_B (it should be understood that the sending component (635) communicates with the stored peer device profiles (650) in order to find the peer device identifier for Seller_B's peer device (600)). In one embodiment, a notification is also sent to Seller_B, wherein the notification comprises information relating to the sender of the token (i.e. Seller_A).

More preferably, Seller_B's peer device (600) contacts the host peer device (615), using the unique token identifier, in order to obtain access to the token. In one embodiment, the token is sent to Seller_B's peer device (600). In another embodiment, Seller_B views the token and associated information on the host peer device (615).

In this environment, with reference to the first scenario, preferably, Seller_A obtains access to the most current version of the original token.

Preferably, Seller_A's peer device (600) contacts the host peer device (615), in order to send a request, via the sending component (605), to access the most current version of the token.

In one embodiment, the request comprises the token identifier of the original token as well as a request to view the most current version of the token.

Once the request is received at the host peer device (615), preferably, the host peer device (615) sends a notification to Seller_B's peer device, notifying Seller_B of Seller_A's request. Preferably, this causes the control component (610) on the peer device (600) to be executed, thereby allowing Seller_B to either reject or accept the request.

If Seller_B rejects the request, communication ends and preferably, a notification is sent to Seller_A's peer device (600). If Seller_B accepts the request, preferably, this causes the searching component (640) to be executed, which then searches the storage area (655), using the token identifier. Once the token versions are found, preferably, the determining component (645) determines the most current version of a token is executed. Once the most current version is found, Seller_A is given access to it.

In one embodiment, the most current version of a token and the associated information is sent to Seller_A's peer device (600). In another embodiment, Seller_A views the token and associated information on the host peer device (615).

The provision of a system with a host peer devices and peer devices provides flexibility for users, as preferably, they are able to use whichever model is this most appropriate for their current geographical location and infrastructure environment. It should be understood that in the hybrid system, if tokens are communicated between peer devices, in order to obtain the most current version of the tokens, the peer devices preferably contact the host peer device.

Advantageously, the provision of a host peer device allows the mechanism to be "lightweight" because the peer devices can communicate by using only the unique token identifiers. Furthermore, in a preferred embodiment the associated information is held on the host peer device and the peer devices can view this associated information on the host peer device. This therefore improves storage capacity on the peer devices.

In one implementation, the present invention can be used to track music files. In this implementation, the music file creator creates a token and attaches (i.e. associates) it to the music file. Preferably, the defining component is configured to define data relating to the music file creator, data associated with a date on which a download occurred, data associated with the device that downloads, data associated with a date on which the downloaded file was sent and data associated with the device that receives the download. As the music file is passed from peer device to peer device, the token data is updated, creating a "trail". This trail facilitates tracking of the music file.

In another implementation, the mechanism of the present invention can be used with existing technologies such as e-mail systems. One problem associated with e-mail systems is that when a user sends an e-mail to the rest of the team, if the user forgets to address a member of the team, that team member will not be able to see the e-mail unless one of the other team members sends the e-mail. Advantageously, the mechanism of the present invention allows any team member to obtain any updates to the information. In one embodiment, this process happens automatically (e.g. via a software agent) and therefore, there is no need for team members to keep track of whom they have collaborated with.

A token provides a mechanism for recording and organizing information, allowing users to capture knowledge and share it with others, either at the point of capture or at a later time of the users' choosing.

Advantageously, the present invention allows collaboration to occur without a central host peer device and this is much more flexible, since tokens can be passed between peer devices without them having to wait until they are connected to the host peer device.

Team members who collaborate also form an established community centered on the information associated with the team. All members of the team can review any updates to the information In addition to these properties, tokens contain life history information (e.g. parent token information etc.) that allows relationships between tokens to be explored. This information can later be consolidated and analyzed.

The invention claimed is:

1. A first peer computer system operable in a decentralized peer to peer network that does not include a central host controlling device, comprising:
   means for accessing a first piece of information;
   means for creating a first entity;
   means for associating the first entity with the first piece of information;
   means for sending the first piece of information to a second peer computer system in the decentralized peer to peer network;
   means for requesting an updated version of the first piece of information from the second peer computer system using the first entity;
   a first storage device having the first entity, the first piece of information and the updated version of the first piece of information stored therein; and
   wherein the first entity is associated with a topic of the first piece of information, wherein the first entity comprises: a unique identifier for the first peer computer system, a date on which the first entity was created, and the first piece of information.

2. A first peer computer system as claimed in claim 1, wherein the first entity further comprises an identifier of a method used to create the first entity.

3. A first peer computer system operable in a decentralized peer to peer network that does not include a central host controlling device, comprising:
   means for accessing a first piece of information;
   means for creating a first entity;
   means for associating the first entity with the first piece of information;
   means for sending the first piece of information to a second peer computer system in the decentralized peer to peer network;
   means for requesting an updated version of the first piece of information from the second peer computer system using the first entity;
   a first storage device having the first entity, the first piece of information and the updated version of the first piece of information stored therein, wherein the first entity is associated with a topic of the first piece of information; and
   means for defining the first entity, wherein the means for defining is configurable using an extensible markup language (XML).

* * * * *